(12) United States Patent
Brace et al.

(10) Patent No.: US 6,943,724 B1
(45) Date of Patent: Sep. 13, 2005

(54) IDENTIFICATION AND TRACKING OF MOVING OBJECTS IN DETECTED SYNTHETIC APERTURE IMAGERY

(75) Inventors: Fred C. Brace, Littleton, CO (US); Joe V. Petty, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/645,365

(22) Filed: Aug. 21, 2003

Related U.S. Application Data

(60) Provisional application No. 60/422,326, filed on Oct. 30, 2002.

(51) Int. Cl.$^7$ .............................................. G01S 13/90
(52) U.S. Cl. ................ 342/25 B; 342/25 R; 342/25 A; 342/25 F; 342/89; 342/90; 342/175; 342/195; 342/196
(58) Field of Search ........................... 342/25 R–25 F, 342/25, 27, 28, 89, 90, 118, 145, 147, 158, 342/159–164, 175, 176, 179, 190–197; 382/100, 382/103

(56) References Cited

U.S. PATENT DOCUMENTS

| | | |
|---|---|---|
| 3,614,778 A | 10/1971 | Graham et al. |
| 3,735,400 A | 5/1973 | Sletten et al. |
| 3,787,840 A | 1/1974 | Dotson |
| 3,787,849 A | 1/1974 | Sletten et al. |
| 3,975,734 A | 8/1976 | Payne |
| 4,052,889 A | 10/1977 | Mucciardi et al. |
| 4,053,885 A | 10/1977 | Tomita et al. |
| 4,086,590 A | 4/1978 | Goggins, Jr. |
| 4,164,788 A | 8/1979 | Jain |
| 4,217,583 A | 8/1980 | Hiller et al. |
| 4,241,350 A | 12/1980 | Uffelman |
| 4,559,537 A | 12/1985 | Pearson, Jr. et al. |
| 4,608,566 A | 8/1986 | Ennis et al. |
| 4,655,228 A | 4/1987 | Shimura et al. |
| 4,675,677 A | 6/1987 | Von Maydell et al. ........ 342/25 |
| 4,761,545 A | 8/1988 | Marshall et al. |
| 4,829,306 A | 5/1989 | Gjessing et al. ............ 342/159 |
| 4,858,124 A | 8/1989 | Lizzi et al. |

(Continued)

OTHER PUBLICATIONS

Rafael C. Gonzalez & Paul Wintz, "Digital Image Processing", 1997, 5 Pages (pp. 16-19).

(Continued)

*Primary Examiner*—Bernarr E. Gregory
(74) *Attorney, Agent, or Firm*—Marsh, Fischmann & Breyfogle, LLP

(57) ABSTRACT

A method of tracking a moving object in an image created by use of a synthetic aperture includes identifying a plurality of receive phase centers for an image collector, obtaining a synthetic aperture image using the plurality of receive phase centers, and reading a signature of the moving object based on the synthetic aperture image, where the reading of the signature includes identifying, in the synthetic aperture image, as a function of image collection time, a presence of the moving object. The reading of the signature may also include identifying a changing position of the moving object, and may include associating a plurality of range difference values with respective ones of the plurality of phase centers. A signature of a scatterer may be formed using only its associated ΔR-versus-time profile. The presence of a mover in the image may be determined by filtering the image to detect all or part of a signature, or by using one or more signatures to train a neural network to observe the mover directly.

49 Claims, 9 Drawing Sheets

U.S. PATENT DOCUMENTS

| | | | |
|---|---|---|---|
| 4,864,307 A | 9/1989 | Potage et al. | 342/192 |
| 4,992,797 A | 2/1991 | Gjessing et al. | 342/192 |
| 5,047,968 A | 9/1991 | Carrington et al. | |
| 5,068,664 A | 11/1991 | Appriou et al. | 342/90 |
| 5,068,666 A | 11/1991 | Voles | 342/192 |
| 5,072,314 A | 12/1991 | Chang | |
| 5,122,803 A | 6/1992 | Stann et al. | 342/25 |
| 5,159,474 A | 10/1992 | Franke et al. | |
| 5,339,080 A | 8/1994 | Steinway et al. | 342/22 |
| 5,345,242 A | 9/1994 | Roberts et al. | 342/159 |
| 5,446,461 A | 8/1995 | Frazier | 342/22 |
| 5,451,961 A | 9/1995 | Rubin et al. | 342/159 |
| 5,469,176 A | 11/1995 | Sandler et al. | 342/375 |
| 5,502,444 A | 3/1996 | Kohlberg | 342/22 |
| 5,539,412 A | 7/1996 | Mendelson | 342/192 |
| 5,546,084 A | 8/1996 | Hindman | 342/25 |
| 5,552,787 A * | 9/1996 | Schuler et al. | 342/25 |
| 5,561,431 A | 10/1996 | Peele et al. | 342/90 |
| 5,563,601 A | 10/1996 | Cataldo | 342/25 |
| 5,563,604 A | 10/1996 | Brandao et al. | 342/159 |
| 5,594,450 A | 1/1997 | Schober | 342/159 |
| 5,612,700 A | 3/1997 | Tucker | 342/90 |
| 5,614,907 A | 3/1997 | Kreitmair-Steck et al. | 342/25 |
| 5,659,318 A | 8/1997 | Madsen et al. | 342/25 |
| 5,675,468 A | 10/1997 | Chang | |
| 5,675,663 A | 10/1997 | Koerner et al. | |
| 5,721,694 A | 2/1998 | Graupe | |
| 5,729,465 A | 3/1998 | Barbaresco | |
| 5,780,775 A | 7/1998 | Yu | |
| 5,790,702 A | 8/1998 | Yoshimura | |
| 5,848,193 A | 12/1998 | Garcia | |
| 5,867,118 A | 2/1999 | McCoy et al. | 342/90 |
| 5,909,190 A | 6/1999 | Lo et al. | 342/159 |
| 5,910,785 A | 6/1999 | Normant | 342/25 |
| 5,936,552 A | 8/1999 | Wichgers et al. | |
| 5,959,566 A | 9/1999 | Petty | 342/25 |
| 5,960,097 A | 9/1999 | Pfeiffer et al. | |
| 6,011,625 A | 1/2000 | Glass | |
| 6,038,337 A | 3/2000 | Lawrence et al. | |
| 6,046,695 A | 4/2000 | Poehler et al. | 342/25 |
| 6,070,461 A | 6/2000 | Gjessing et al. | |
| 6,150,972 A | 11/2000 | Bickel et al. | 342/25 |
| 6,173,066 B1 | 1/2001 | Peurach et al. | |
| 6,252,754 B1 | 6/2001 | Chaudhry | |
| 6,288,776 B1 | 9/2001 | Cahill et al. | |
| 6,333,986 B1 * | 12/2001 | Petty | 382/103 |
| 6,337,654 B1 * | 1/2002 | Richardson et al. | 342/90 |
| 6,347,264 B2 | 2/2002 | Nicosia T al. | |
| 6,377,206 B1 | 4/2002 | Petty | 342/159 |
| 6,384,766 B1 | 5/2002 | Ulander | 342/25 |
| 6,437,728 B1 * | 8/2002 | Richardson et al. | 342/90 |
| 6,441,376 B1 | 8/2002 | Glass et al. | |
| 6,492,932 B1 | 12/2002 | Jin et al. | 342/25 |

OTHER PUBLICATIONS

Chapter 7 Image Processing Basics, 7.3 Visual Phenomena, 4 Pages (pp. 429-432).

Bruce P. Boger et al., "The Quefrency Alanysis of Time Series for Echoes: Cepstrum Pseudo-Autocovariance, Cross-Cepstrum and Saphe Cracking" Brown University, Jun. 11-14, 1962, pp. 209-243.

Alan V. Oppenheim et al., "The Importance of Phase in Signals", 1981, pp. 529-541.

Liberty Instruments, Inc., "Reflecting on Echoes and the Cepstrum: A Look at Quefrency Analysis and Hearing", Jan. 24, 2000, 11 Pages (1-10 and 1 of 1).

Azriel Rosenfeld et al., "Digital Picture Processing" Second Edition vol. 1, 1982, 7 Pages (pp. 126-131).

William H. Press et al., "Numerical Recipes in Fortran", The Art of acientific Computing Second Edition, Cambridge University, pp. 584-599.

Carrara, Walter G., "Spotlight Synthetic Apperture Radar", Artech House, Inc. 1995, pp. 237-243.

4.2 Inverse Image Filtering, Author Unknown (XP-002154117).

Bruce Chapman, "SAR Interferometry and Surface Change Detection", II. Basic Principles of SAR Interferometry, Apr. 29, 2003, pp. 1-9.

* cited by examiner

IDENTIFICATION AND TRACKING OF MOVING OBJECTS IN DETECTED SYNTHETIC APERTURE IMAGERY

This application claims priority from U.S. Provisional Patent Application Ser. No. 60/422,326, filed on Oct. 30, 2002, which is hereby incorporated by reference in its entirety.

FIELD OF THE INVENTION

The present invention relates to synthetic aperture imagery, and more particularly, to the identification and tracking of moving objects by using multiple receive phase centers for a synthetic aperture radar (SAR) image collector.

BACKGROUND OF THE INVENTION

An imaging radar transmits electromagnetic waves to objects within a region of interest that scatter, or reflect, the energy according to the properties of such objects (e.g. physical attributes). When the radar receives reflected waves from the objects a spatial distribution of the reflected energy may be constructed by a processor. This distribution defines a radar image that may be displayed as a 3 dimensional representation of the scene or any 2-dimensional representation thereof.

A real-aperture imaging radar, as opposed to a synthetic-aperture imaging radar (SAR), irradiates each location in the scene in turn. The line-of-sight (range) distance to a location is determined by the round-trip time of the reflected pulse; resolution in the range direction is determined by the duration of the reflected pulse; the cross-range location is determined by the pointing angles of the antenna; the cross-range resolution is determined by the beam width of the antenna. The range resolution can be less than a meter but conventional microwave antenna beamwidths may limit the resolution in the angle coordinate (i.e. cross range limitation).

This limitation may be overcome by synthesizing the effect of a large antenna. That is, the radar may be located on a moving vehicle and the reflected waves of successive radar pulses may be measured and stored in a memory. In this configuration the actual beam is wide enough to illuminate the entire scene at once, and does not have to scan from one location to the next in order to form an image. The stored reflected wave information is coherently processed to obtain a synthetic aperture radar (SAR) image.

In use, SARs may function as all-weather imaging radar systems and typically produce two-dimensional (2-D) or three-dimensional (3-D) images, with intensity as an additional non-spatial image dimension. Data collection and data processing may be performed by a variety of methods. Regardless of method, the location of a stationary point in the scene is determined by the temporal profile of both line-of-sight distance between the point and the collection antenna (however, the information is generally not used directly in this form). The processor attempts to make sense of the collected data by assuming that all points in the associated scene are stationary.

Conversely, a rigid object may be imaged if the collector is stationary and the object moves past the collector. This method is called inverse SAR (ISAR). Similar to the SAR, ISAR also produces two-dimensional or three-dimensional images with intensity as an additional non-spatial image dimension. However, ISARs use the motion of a viewed object to synthesize a large aperture antenna and not the motion of the radar platform itself. Both the translational and rotational motion of the object must be accurately known. Features of SAR systems may be equally applicable to ISAR and, where applicable, the two systems may be referred-to generally as being SAR systems and may be configured separately or in combination.

While conventional systems have been quite successful in presenting images to trained personnel for interpretation, drawbacks have been encountered. Specifically, moving objects may not be visible in traditional SAR imagery due to the fact that radar energy may be widely scattered in the image by the processor. Conventional methods have used special radar systems that are designed to see and/or track moving objects, but which cannot form, using either an integrated process or a separate process, an image of the object's environment. Since such mover detection methods are a part of the image formation process and cannot be readily separated therefrom, special tasking, special collections, or special image processing are conventionally required for detecting moving objects using SAR imaging.

SUMMARY OF THE INVENTION

A primary object of the present invention is to identify the location and nature of moving scatterers in a SAR image.

In conjunction with the primary objective, a further object of the present invention is to avoid special tasking, special collections and/or special image processing.

An additional object of the present invention is to provide a mover-detection process that is separate and distinct from a SAR image formation process, wherein the mover-detection process may be performed at a later time and at a different location.

It is a further object of the present invention to provide a process for detecting and tracking movers in a SAR image that is relatively unaffected by the velocities or trajectories of the movers, wherein high speed and/or maneuvering movers do not require special consideration.

Yet another object of the present invention is to provide a process for identifying movers in a SAR image at a given instant in the collection interval, wherein such identification is independent of any process of identifying movers at any other instant. For example, it is desirable to provide a method where the identification of movers at a single instant indicates the presence of movers and their location at a specified time.

Described herein is a system and method for identifying one or more moving objects in a synthetic aperture radar (SAR) image in a scene of interest. According to the method described herein, an image collector device is configured to include a plurality of receive phase centers. After the image information is collected using the image collector device, a SAR image may be generated. The SAR image may be analyzed to detect one or more signatures indicative of a moving object in the region of interest. The signatures may be detected as a function of image collection time.

In one configuration of the invention, the signatures may comprise one or more low intensity 3-dimensional artifacts generated as a function of the use of a plurality of receive phase centers in the image collection device. The artifacts may have polar symmetry and decrease in intensity with distance from the point of symmetry. Further, the low intensity artifacts may comprise two categories which include category 1 artifacts and category 2 artifacts, wherein the category 1 artifacts represent actual images of a mover in the scene of interest while the category 2 artifacts are extraneous. The category 1 artifacts may be formed as a combination of a plurality of received pulses all originating from a common transmitted pulse. Category 2 artifacts may be formed as a combination of a plurality of received pulses, each originating from a different transmitted pulse. Although category-2 artifacts are not explicit images of a mover, as a group they uniquely characterize a mover's position and velocity.

Still further, the range impulse response (IPR) for all the category 1 artifacts may be the nominal range IPR for the synthetic aperture image. The two principal cross-range IPR's may be unequal and much larger than the range IPR. That is, a constant intensity surface of a category-1 artifact resembles an elliptical flat-cake where the instaneous range direction is normal to the flat surface. When analyzing a SAR image the orientation of a category 1 IPR may be further employed to determine a time frame for the generation of the particular point. The orientation of the category 1 artifact may relate to the range direction of said artifact relative to the collector device. This relative orientation is employable to identify the location of a moving object in a particular time frame. Because the low intensity image may not otherwise be viewable when creating the SAR image, small visible spheres may be placed in the SAR image at the center of the category 1 IPR's.

In order to detect the signatures of the movers within the SAR image, various processes may be performed. The processes include pre-filtering the detected image using a spatial filter to obtain a pre-filtered image containing only low-intensity images. That is, the images may be filtered directly to remove such things as medium and high intensity stationary points. As such the image may be transformed, and the transformed image may be further filtered. The detection of the signature may include filtering of the detected image or of the prefiltered detected image to identify the locations of the category-1 artifacts and/or to determine the orientations of the category-1 artifacts in the image—since data collection—start. A determination of the orientation may include computing a range direction of category-1 artifacts associated with a given time-since-collection-start, and then filtering to retain only those artifacts with the given range directions, thereby recovering only category-1 artifacts associated with the given time.

The detecting of the signature may further include determining linear filtering parameters for separating a signal from noise in the SAR image. However, the reading of the signature may also include non-linear filtering of the SAR image to recover very low-intensity signals. For example, if the separating of the signal from noise is unsuccessful, then the reading of the signature may include implementing pre-whitening filtering and non-linear filtering of the synthetic aperture image for separating the signal from the noise. Separation of desired low-intensity signals may include a use of stochastic methods, such as adding noise to a given signal in order to increase a sensitivity of signal detection. The reading of the signature may include identifying movers at several instants equally spaced in time in order to identify a direction and velocity of the movers.

In yet another configuration of the invention, the detecting of the signature may include providing a simulated image of a mover as a template for a matched filter and applying the matched filter in order to characterize an ability to identify a position of the moving object. The method may also include adding a simulated image of a mover to each of a plurality of noise samples of a same length as the simulated image, thereby obtaining a signal-plus-noise for each of the plurality of noise samples, the noise samples being essentially statistically identical in amplitude with one another and having different autocorrelation functions, and determining an impact of at least one of the plurality of noise samples on a corruption of the simulated image.

Still further, detecting of the signature may include identifying, in the image as a function of image collection time, a presence of the moving object, a nature of the moving object, and a changing position of the moving object. The reading of the signature may include selecting geometry and timing parameters, and/or may include utilizing a priori information of distinctive signatures of signals in the generation of matched filters employable in analyzing the SAR image. The method may further include applying a plurality of the matched filters to the image in a serial fashion. When a signature is detected in the image using a particular matched filter, the identity of the moving object may then be determined based on information associated with the particular filter.

In yet another configuration of the invention, various other processes may be employed for analyzing the one or more low intensity artifacts in an image in order to identify a mover. For example, a neural network may be employed to analyze the distribution of a series of category one and/or two artifacts which appear in an image in order to identify the type location and velocity of a mover. This technique may also be employed in analyzing the density distribution of category one artifacts.

Further described herein is a system for detecting and identifying moving objects in a SAR image which may include an apparatus for generating a SAR image using data collected through use of a plurality of receive phase centers in a collector. Also included may be a filtering apparatus which is configured to perform at least one filtering function to enhance detection of at least one image artifact in the SAR image generated as a result of use of the plurality of receive phase centers in the collector. In communication with the filtering apparatus is an image analyzing apparatus which is configured to analyze at least one image artifact in the SAR image to identify at least one signature of at least one moving object.

In one configuration of the invention, the filtering apparatus may be configured to filter a SAR image using a spatial filter in order to obtain an image containing only low intensity images. The filtering apparatus may be further configured to identify a shape model for a low intensity image, the shape model being based on an IPR form. The filtering apparatus may further determine the range direction of a variety of low intensity images associated with a predetermined time-since-collection-start. The image may be further filtered to retain low intensity images having range directions lying essentially in a same direction as the range direction associated with the time-since collection start. The low intensity images identified through use of the filtering apparatus may comprise the category 1 artifacts described above.

The analyzing apparatus may be further configured to determine pattern characteristics of a density distribution of the low intensity artifacts within an image. The analyzing apparatus may further access a memory device which stores one or more density patterns for comparison purposes. The stored patterns may comprise one or more matched filters which include characteristics of particular types of moving objects. The analyzing apparatus may be configured to sequentially apply the matched filters to a filtered or unfiltered image in order to identify one or more moving objects.

As a result of the present invention, moving objects are identified and located in detected imagery such that the images containing the movers do not require special tasking, special collections, or special image processing. The synthetic aperture images are tasked, collected, and processed as nominal imagery. The process only requires a synthetic aperture image, and selected geometry and timing parameters. For example, by providing a method where identifying movers at several instants spaced in time, the direction and velocity of the movers may be identified.

By identifying movers at spaced instants in time over an entire collection interval, the position/velocity profile of the movers over the interval may be identified. Therefore, for example, an image processor can easily be reconfigured to generate a high-resolution image of a mover. Thereby, an amount of processing and a corresponding processing time may be reduced, and special collections and tasks are not required. In addition, the mover-detection process may be separate and distinct from the image formation process, and may be performed at a later time and at a different location.

The present invention may be applied for various applications including, but not limited to, government applications such as search and rescue, police support, and military, economic, and political intelligence, and commercial applications such as tracking moving assets traveling by land, sea, or air. For example, the present invention may be applied to bistatic collection techniques, to multiple collector techniques, to multiple collection pass techniques, and to synthetic aperture techniques used for sonar systems that listen for a return of energy. Further, the fact that the configurations address general 3-dimensional imagery does not preclude that they also encompass 2-dimensional imagery and 2-dimensional representations of 3-dimensional imagery.

The various embodiments described herein may be used in any suitable combination, depending on a particular application, and are not exclusive of one another. Additional aspects and advantages of the present invention will become apparent upon consideration of the description that follows. This summary does not limit the invention, which is instead defined by the appended claims.

Additional aspects and advantages of the present invention will become apparent to those skilled in the art upon consideration of the further description provided hereinbelow.

DETAILED DESCRIPTION

FIGS. 1–9 illustrate various features of the method and system of the present invention. Generally, the method and system of the present invention are directed to processing image data relating to images collected by a synthetic aperture radar imaging system that may use real and/or complex image data to detect and/or classify a cultural object and/or a replicated object. The method and system of the present invention are particularly useful for detecting and/or tracking moving objects. For example, a method and system of the present invention may be used to detect and/or track moving objects that are not readily visible in an image or that are moving at a high rate of speed. The present method uses SAR image formation for describing the signature of a moving object in order to identify what the given inputs actually represent.

Figure 1:
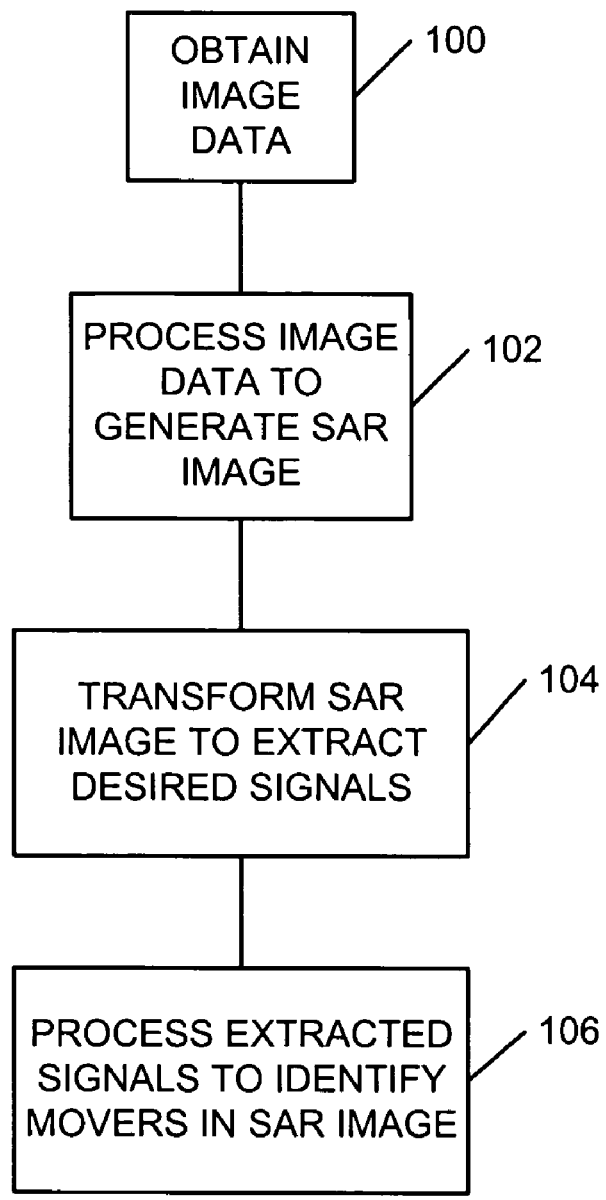
FIG. 1 discloses an exemplary method for processing a synthetic aperture radar (SAR) image and to perform mover identification.

Referring to FIG. 1, disclosed therein is a method for processing synthetic aperture radar (SAR) data so as to perform one or more functions which may include the detection and identification of at least one mover with the SAR image. In step 100, the SAR image data is initially collected and stored in a memory device. The collection may be performed by one or more vehicles traveling by a scene of interest. The data collection process may be performed according to any number of data collecting schemes which are known in the art. For example, radar data may be collected using a collector device configured with multiple phase centers. The radar data may be collected using either un-modulated or modulated pulses. The modulated pulses may employ any number of modulation schemes.

In an exemplary embodiment of the invention, a vehicle traveling along a predetermined path includes a transmitter which may be configured to transmit RF pulses at predetermined intervals towards one or more points of interest. Also included on the vehicle may be one or more energy collecting devices such as a phased array antenna. In one configuration of the invention the antenna system may include multiple phase centers. The phase centers may be configured in any number of ways which, for example, include use of multiple parabolic or other antennas, use of multiple channel phased array antenna use of multiple feeds, a combination of antenna structures and electronics, and/or any number of other configurations. "Phase centers" and synthetic aperture detection methods, apparatus, and systems are readily understood by those of ordinary skill in the art and are not described herein in detail.

A phase center is generally understood to be a designated real or virtual point through which all desired radiation effectively passes during any given period of time. Additionally, all of the radiation associated with a wave front of a normal uniform wave arrives at the phase center simultaneously. For example, in a typical parabolic antenna structure, a feed horn may be positioned at a phase center for optimum transmission and/or reception of radiation. Examples of structures that can provide multiple phase centers include, but are not limited to, multiple separate antennas each having one or more separate feeds, a phased array antenna structure typically having a matrix containing thousands of individual elements, where a given transmission may include transmitting through selected individual elements, and phase and amplitude may be adjusted for each individual elements, or other structures. In the phased array example, individual elements may be combined to support a phase center, each element may support multiple phase centers, and a plurality of phase centers may be electronically obtained in various selectable configurations. For example, the phase centers in an array may be spaced according to a number of criteria, which may include the velocity of the vehicle and the frequency of pulse emission.

Once the image information for a scene of interest is collected, it may be stored in any number of memory devices so that it may be further processed in order to be transformed into an actual SAR image. As part of the image processing of step 102, any number of processes may be performed to convert the compiled data. For example, a Fourier transform method may be employed to create a SAR image. The result of such a process is a "complex image" which is a matrix of pixels usually having different complex numbers associated with each pixel. In other words, each pixel is associated with two numbers corresponding to the real part and the imaginary part of the complex number. Replacing each complex number with its magnitude results in obtaining the detected image. Each pixel may then be associated with a single real number corresponding to the magnitude of the complex number. Reducing the value of a pixel to a single quantity allows the detected image to be displayed directly by simply using the magnitudes as the gray scale level for the pixels. However, the magnitudes are usually first scaled and/or "remapped" to obtain the gray scale levels for the final image. The scaling or re-mapping is preferable because the final result is more visually acceptable.

After obtaining a SAR image, automated signal processing may stop. The information of interest in the SAR image may at this point be manually extracted by experts viewing the image. However, experts may be unable to extract the desired information from the image due, for example, to the information in the image being dominated by competing effects not of interest. For example, the image of a mover may be a dispersed set of very low intensity signals buried in noise or not readily visible by a viewing person. According to step 104, in order to make visible one or more moving objects within the image, various processes may be performed with regards to the SAR image data. For example, conventional filtering is generally used to get rid of corruption, whereas in the present invention the signature of a mover may appear like corruption. In other words, by characterizing the corruption in a determination of signatures, a high detection rate or resolution may be obtained. An exemplary characterizing of corruption is described in U.S. Pat. No. 6,333,986 granted to Petty, which is hereby incorporated by a reference. In this regard, a cepstral method of the U.S. Pat. No. 6,333,986 is particularly useful for very low signal/to/background ratio cases, with separation of signals having a zero or lower decibel (dB) level not being uncommon. One example of obtaining the signatures of objects within a SAR image is through the use of a data screener that includes a multiple transform clutter decorrelation, which is discussed further below.

According to step 104, one or more signal processing algorithms may then be employed that attempt to separate the signals from the competing effects so that, when practical, the signals of interest are viewable by the human eye. The signal processing algorithm employed may characterize the SAR image, or portions thereof as patterns. In general, the processing may accomplish this by transforming the detected SAR image to another domain, where the interesting effects are more distinct from the competing affects.

Samples of other transforms which are employable for this purpose include Fourier transforms, wavelet transforms and Karhunen-Louve transforms.

Other processes which may make visible one or more moving objects within the image include transformation by a neural simulation that is trained (weight adjusted) to identify movers.

After the processing steps are performed in step 104, various analysis processes may then be performed in step 106 to identify objects of interest such as movers. In analyzing the SAR image as described in step 106, the use of a multiple phase center antenna to collect data provides unique opportunity to detect and identify moving objects in the SAR image. As will be described in greater detail below, when collecting data using a multi phase center system, moving objects have unique energy signatures which may be exploited when analyzing an image. It should be noted that the signatures are not necessarily an image of the object, but a characterization of the dispersed low intensity artifacts that represent the mover.

It should be noted at this point that steps 104 and 106 in the process disclosed in FIG. 1, do not need to be performed as separate steps. In one configuration of the invention described herein, various processes may be performed on a unfiltered SAR image to identify objects of interest. For example, using the matched filters which will be described in greater detail below, the filtering and object identification are combined in a single process.

With regards to additional processing performed in moving object identification, a signature for a moving object may make use of a profile (e.g. range differences ($\Delta R$)) as a function of the image collection time. The signature may be extracted from the image by identifying one or more patterns, each associated with a known signature of a mover. The signature may, in fact, describe very low intensity scattered energy that is not visible or otherwise distinguishable by an expert viewing an image. As a result, a signature may provide improved information regarding the presence of a mover, the nature of that mover, and the changing position of an object in an image, as function of the image collection time.

Figure 2:
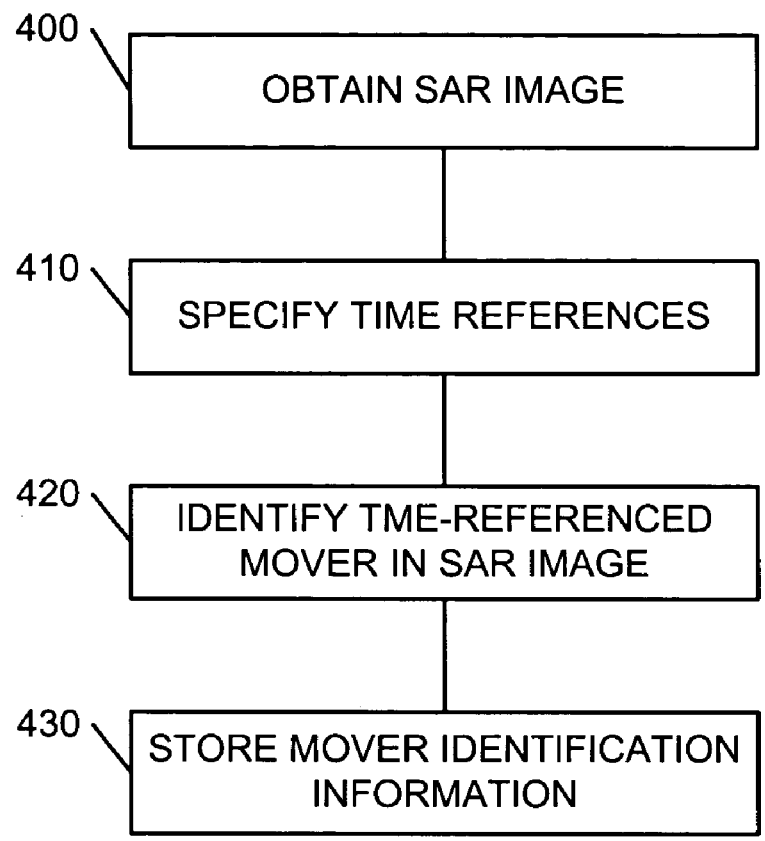
FIG. 2 discloses an exemplary method for identifying movers in a SAR image.

Disclosed in FIG. 2 is an exemplary method for identifying movers in a SAR image, the method only requiring a detected image with selected geometry, and timing parameters. Once the SAR image is obtained in step 400, in step 410 one or more time references are specified for the collection image data. These time references may relate directly to the timing of the transmitted pulse from which the image data was collected. The process for identifying image data according to a time frame will be discussed in greater detailed below.

In order to identify a mover, in one configuration of the invention, at step 420 one or more time-specific templates of the image of the mover are used to filter the image to identify the location of the mover at the specified time. Depending on the velocity of the mover, suspected movers may initially appear as visible streaks in an image, or they may be identified by use of any number non-linear filtering techniques, decorrelation, and/or transformation, employed in processing. In addition, the mover detection may include other types of filtering, for example, clutter rejection and other enhancement and extraction methods. In another configuration of the invention at step 420, time-specific templates of the image of the mover are used to train a neural simulation, which in turn processes the image to identify the location of the mover at the specified time. The direction and velocity of the movers may then be determined by overlaying separate copies of the detected image for each time reference, thereby creating a type of "motion picture" of the movers. In step 430 a result of the mover identification may be stored for further processing.

Figure 3:
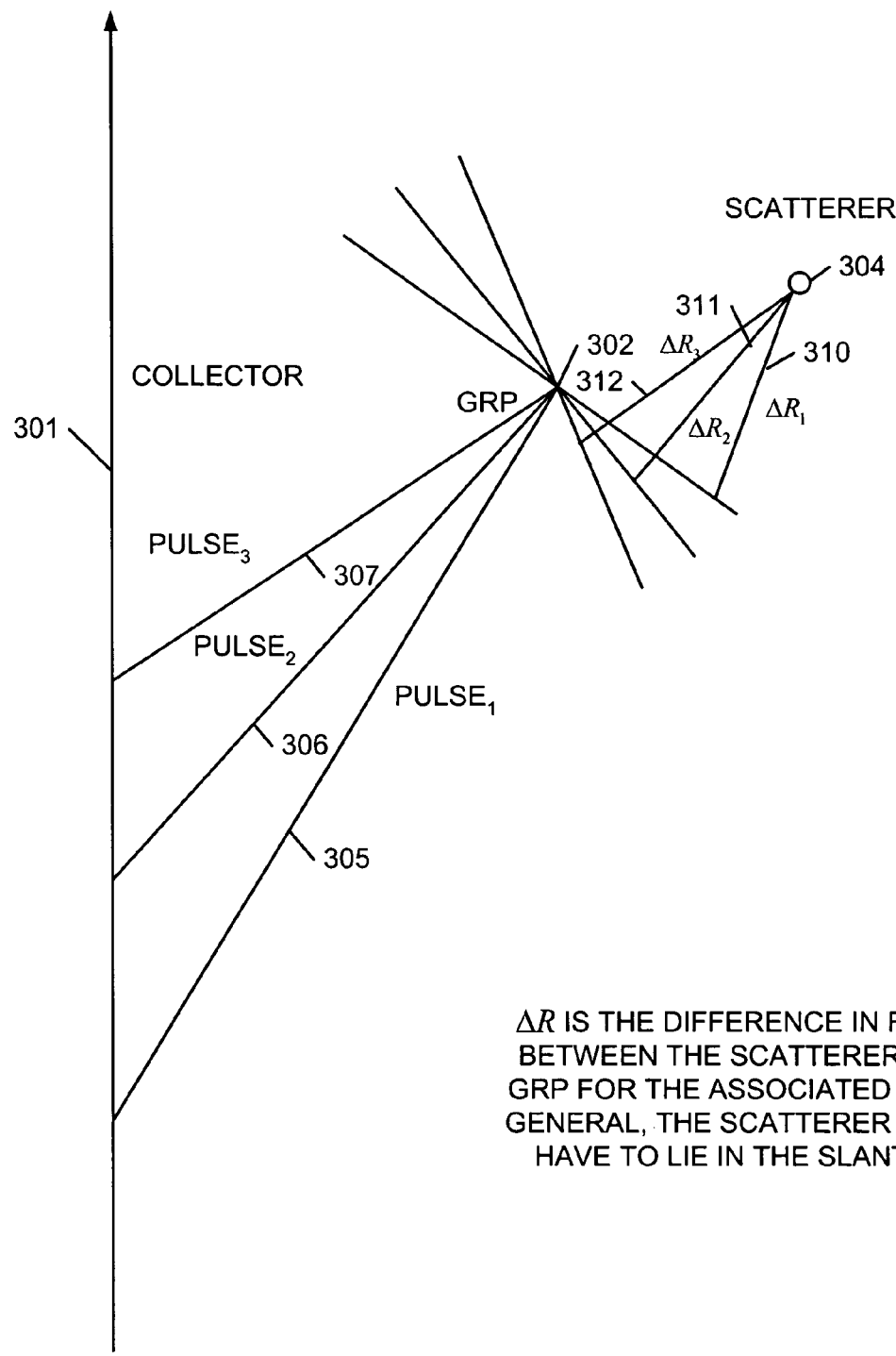
FIG. 3 discloses a diagram which illustrates the receipt of SAR image data and in particular the range difference (ΔR) between a scatterer and the GRP for different pulses.

To more specifically describe the steps performed in the method of FIG. 2, it may be beneficial to describe the significance of the low energy points and patterns which may be included in a SAR image. Provided below is a description of how these low energy artifacts are created and included as part of the SAR image. Disclosed in FIG. 3 is a diagram which provides an illustration of the data collection process. In the data collection process, a collector 301 will travel past a scene of interest along a known path. While traveling along the known path, pulses will be periodically transmitted towards a scene of interest. Reflected pulses from a scatter 304 in the scene of interest will be detected by the collector. Based on energy received at the collector, a SAR image may be generated.

In general, multiple collectors or single collectors traveling past the object one or more times may collect data that is subsequently used to generate 2-dimensional and/or 3-dimensional images of the scene. To simplify the explanation without loss of generality, the Figures depict single collectors and 2-dimensional scenes.

The collector device 301 may be an antenna which in the configuration described here, includes one or more receive phase centers for detecting the radiation reflected off of the scatterer 304. The ground reference point (GRP) 302 is a reference point in the scene that may be either fixed or moving (scanning) with respect to the scene. Although a scan GRP is not described for the current embodiment, the process to identify moving objects may be used for scanned imagery.

Also shown in FIG. 3 are pulses 305–307, which have been reflected by the scatterer 304. If a multiple phase center antenna is employed, pulse 305 could be the first received signal and pulse 307 could be the last received signal from the transmission of a single pulse. Pulse 306 would be any intermediate pulse in a case where there are more than two receive phase centers. Alternatively, if either a multiple phase center antenna or a single phase center antenna is employed, pulses 305–307 could be any three receive pulses in a collection.

Associated with each received pulse is a $\Delta R$ value 310–312 which is the range difference between the scatter and the GRP. For a given scatterer, as the collection proceeds, the associated $\Delta R$ 310–312 varies. A $\Delta R$ for a scatterer is noted in each time frame and defines a $\Delta R$ vs. time profile for each scatterer. Each stationary scatterer will generally have a different $\Delta R$ vs. time profile. Stationary points in a scene of interest are easily identified because their $\Delta R$ vs. time profile is predictable. As such, a processor may be able to associate a detected scatterer with a known profile and consequently identify the associated stationary point in a SAR image. It is important to mention that for a given trajectory of a collector, it is possible to specify $\Delta R$ vs. time profiles that are not associated with any stationary scatterer in the scene.

Single Phase Center Collector

Before discussing imagery collected using a multiple phase center collector, it is necessary to understand imagery collected using a single phase center collector.

For a single phase center collection, each $\Delta R$ vs. time profile may be associated with an infinite (e.g. arbitrarily large) number of potential moving scatterers, even though it may also be associated with a single non-moving scatterer in the same scene. This property is not referring to an infinite number of points along the single path of a moving scatterer, it is referring instead to an infinite number of paths spread across the scene.

In processing image data for a single phase collector, the following description represents the operations of a processor employable for that purpose. Its operation provides insight regarding the nature of single phase center SAR imagery.

In order to provide a frame of reference for creating $\Delta R$ vs. time profiles for scatterers, initially the three dimensional scene of interest may be partitioned into uniformly sized cubes such as one cubic foot. The relative orientation of the reference frame does not matter as long as the block of cubes encompasses the scene. The cubes are then indexed using the three coordinates that specified their center points. If the trajectory of the collector is known, then a GRP is chosen and, for each cube a theoretical $\Delta R$ vs. time profile may be generated.

This profile may then be associated with the three centerpoint coordinates. With this database of theoretical $\Delta R$ profiles generated, the SAR data for a particular scene of interest may be processed and the measured $\Delta R$ profiles may be compared against the reference $\Delta R$ profiles. When a match is obtained, the coordinates of the associated center points may be established as the coordinates of the scatterer. In certain situations, measured $\Delta R$ profiles may not match any of the stored profiles. Each profile, whether or not it can be associated with a fixed point in the scene, can be associated with an infinite number of moving points.

Before the identification of movers is described in detail below, a number of processing considerations should be further noted. First, it should be assumed that the processing algorithm tries to make sense of any measured ($\Delta R$) profiles by assuming the associated scatterers are non-moving. Second, to save processing time it is not necessary to generate a three-dimensional image initially. It can be assumed that all of the scatterers reside in a specified plane (called the focus plane) and the processor typically tries to make sense out of the ($\Delta R$) profiles in this context. As an example, if a scatterer does not lie in the focus plane and the processor is unable to match exactly the measured $\Delta R$ profile, it is instead assigns several locations that are close. Optionally, after the fact, it is is possible to process the errors associated with the out-of-focus scatterers to generate a 3-dimensional image. Third, moving scatterers typically do not map into a single point in the final image. Although it is possible, it typically requires a number of factors to serendipitously converge. Finally, a system processor is typically able to associate reflected energy from a particular scatterer from one pulse to another. As such, regardless of if the scatterer is stationary or moving reflected energy from a pulse may be associated with a particular scatterer.

Figure 4:
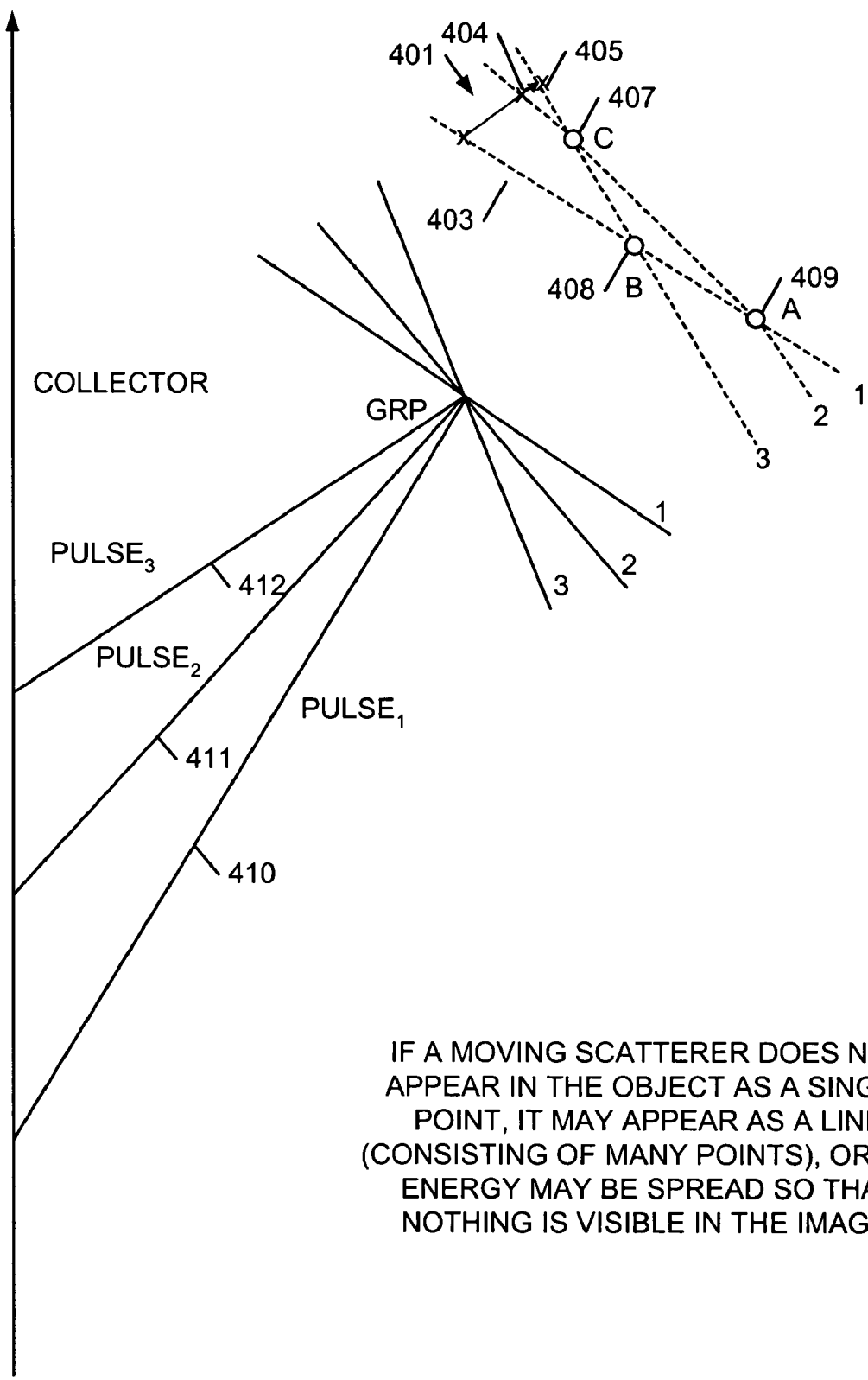
FIG. 4 discloses a representation of a moving scatterer which may appear in a image as a plurality of low energy points.

In the case of a typical moving scatterer, a $\Delta R$ profile does not usually result in a set of $\Delta R$ loci that can also represent a single point. As such, the processor makes some compromises based on the information provided. Disclosed in FIG. 4 is a 2-dimensional example of the solution a processor will develop when the $\Delta R$ profile of a moving scatterer does not also represent a single point in the final image. In this example, pulses 410–412 are reflected pulses, each of which originates from a separate transmitted pulse. Included in the diagram are the actual locations of a mover 401 at different times. More specifically, position 403 is the location of the mover at $t_1$, position 404 is the location of the mover $t_2$ and position 405 is the location at $t_3$.

Also included in FIG. 4 are points 407, 408, and 409, which are a set of low intensity images which the processor generates based on the profile information received for scatterer 101. In its calculation, the processor assumes that pulses 410 and 411 are associated with low intensity point 409, likewise, pulses 410 and 412 are associated with point 408 and pulses 411 and 412 are associated with point 407. If N is the number of pulses in the collection, then it follows that the maximum number of low intensity points that a moving scatterer can generate is N*(N−1)/2. Each of these extraneous, extremely low intensity points has a unique impulse response (IPR) shape, IPR orientation, and azimuthal aliasing. The range dimension of the IPR is the range dimension of a nominal resolution cell. IPR in azimuth is the cross range dimension of a resolution cell in the plane of the figure (called the slant plane). In particular, azimuthal aliasing and azimuth IPR may vary drastically from point to point.

For a given extraneous point, the only pulses that are relevant are the two pulses that form the point. The collection angle for the point is the collection angle associated with these two pulses and the pulse repetition frequency (i.e., the frequency at which the pulses are transmitted, not the frequency of the echo wave radiation in the individual pulses) for the point is the reciprocal of the time between the transmissions of these two pulses. The range IPR for all these points is the nominal range IPR for the image. The range direction for a given point is the bisector of the point collection angle. The azimuth direction is perpendicular to the range direction in the slant plane of the point. Consequently, it is possible that the azimuth directions are different for each point. Azimuth IPR and azimuthal aliasing are determined by the collection angle and by the PRF associated with the point. For points generated by consecutive pulses the azimuth IPR is very large (since the collection angle associated with consecutive points is very small) and aliasing is the nominal aliasing for the image (since the PRF associated with consecutive pulses is the imaging PRF.) Conversely, for points generated by widely separated pulses, the azimuth IPR approaches the nominal image azimuth IPR, but the points are severely aliased. The above description for FIG. 4 may be extended to 3-dimensions by associating 3 noncoplanar pulses with a given extraneous point.

After processing is complete, the moving scatterer appears in the final image as the sum of the given assortment of very low intensity points. The low intensity points have varying IPR's, IPR orientation and aliasing, and the results in an image may or may not be visible. In general, the energy associated with the moving object is dispersed so that nothing may be visible in the final image. Further, many, if not most, of the extraneous points may lie outside the final image, and the points that lie inside the image are extremely weak and far apart.

Multiple Phase Center Collector

Like a single phase center processing algorithm, a multiple phase center algorithm tries to make sense of any measured (ΔR) profiles by assuming the associated scatterers are non-moving. Also, the system processor is typically able to associate reflected energy from a particular scatterer from one pulse to another. Unlike a single phase center collection, each ΔR vs. time profile may be associated with either a unique stationary point or a unique moving point in the image. That is, a point is uniquely specified by its ΔR vs. time profile, regardless of whether it is moving or stationary.

Figure 5:
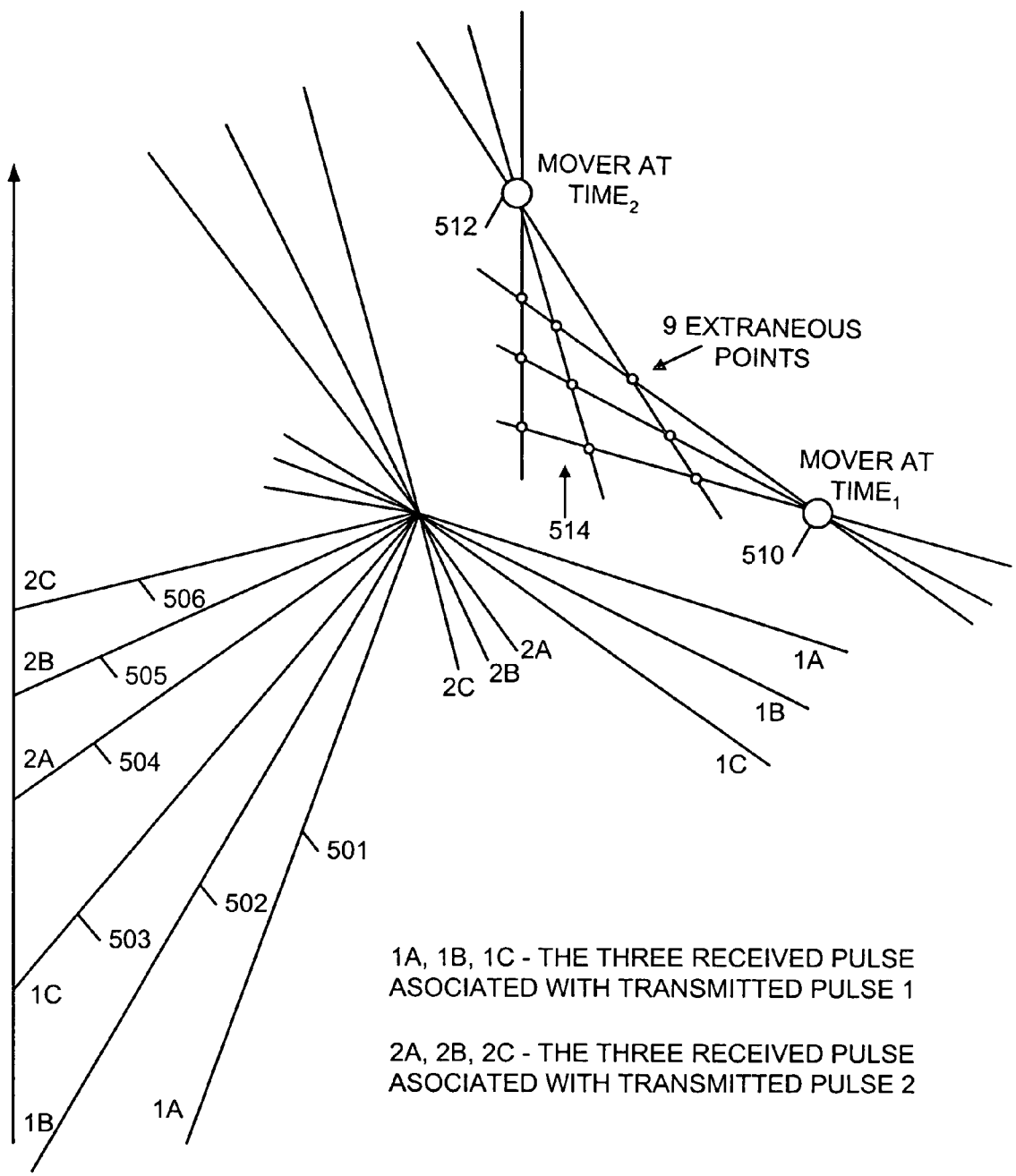
FIG. 5 discloses a diagrammatical presentation of category 1 and category 2 points when generated using multiple-receive phase centers.

In the exemplary method discussed herein, the collector will include three phase centers, each of which will receive a single reflected pulse for each pulse transmitted. Accordingly, presented in FIG. 5 is a diagram which discloses the generation of low intensity artifacts in an image when multiple phase centers are employed in the collector. In this figure, pulses (501), (502) and (503) are the received reflections of transmitted pulse 1, while pulses (504), (505), and (506) are the received pulses for transmitted pulse 2. As was noted above with stationary scatterers, the image processor does not consider whether or not a single transmitted pulse generates one scattered pulse or three scattered pulses because the scatter location does not change and profiles are easily identified. However, an entirely different situation exists when a scatterer is moving.

In the diagram of FIG. 5 it is seen that in processing the image in which movers are located, two categories of low intensity artifacts are generated. The first category consist of actual images of the mover. As is seen in FIG. 5, points 510 and 512 are actual images of the mover. When a transmitted pulse scatters off a moving point, the three associated received pulses specify a low intensity image of the point. The location of this category 1 point is the location of the mover at the time the transmitted pulse was scattered.

Turning again to FIG. 5, artifacts 510 and 512 represent the actual location of the mover at the time of each transmitted pulse. These points are generated by the three associated received pulses and are a low intensity image of the mover at the actual location. They are identified herein as category 1 artifacts. In FIG. 5 the image of a single mover is shown as two artifacts. If N is the number of transmitted pulses in the collection, then the maximum number of category 1 low intensity artifacts that a moving scatterer can generate is N.

The set of artifact's (514) shown in FIG. 5 are identified herein as category-2 artifacts. These category-2 artifacts consist of the same extraneous artifacts that were identified for the single phase collector discussed above. In FIG. 5 it is shown that there are nine category-2 points associated with two transmitted pulses. If N is the number of transmitted pulses in the collection, then the maximum number of category-2 low intensity artifacts that a moving scatterer will generate is 9*N*(N−1)/2. In generating the images, the category-1 artifacts should be slightly more intense than the category-2 artifacts, since the category-1 artifacts are formed using three received pulses while the category-2 artifacts are formed using only two received pulses. A moving scatterer will appear in the final image as the sum of its associated category 1 and category-2 artifacts.

In addition to the difference in intensity of the category-1 artifacts, the IPR shape, IPR orientation, and azimuthal aliasing for category-1 artifacts are better defined than for category-2 artifacts. This is a further feature which may be exploited in identifying movers. The range IPR for all category-1 points is the nominal range IPR for the image.

Figure 6:
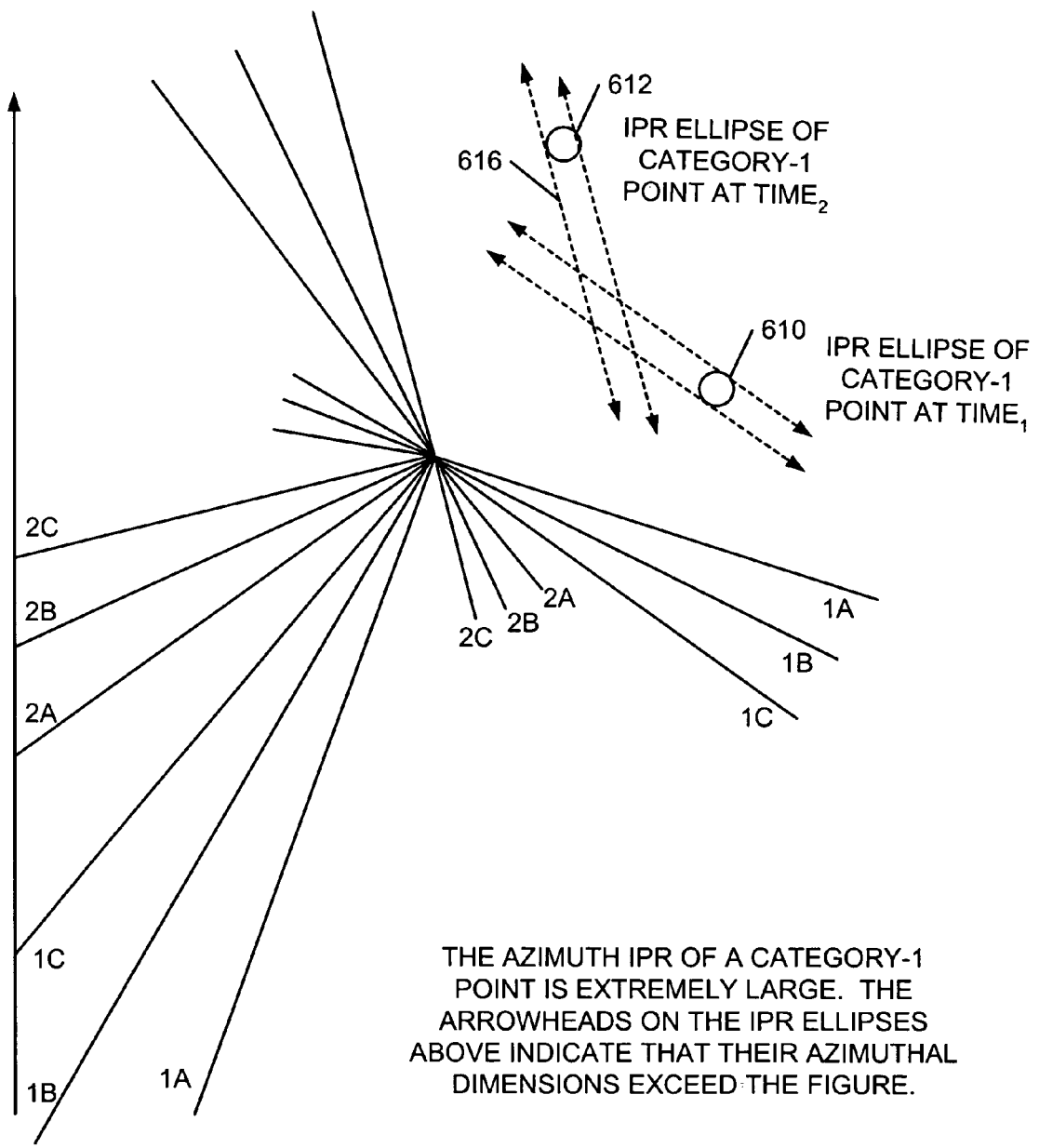
FIG. 6 depicts impulse response (IPR) for multiple-receive phase centers.

Disclosed in FIG. 6 is a diagram which discloses in particular the IPR shape for the category-1 artifacts. For reference purposes, the "range direction" for a given point is the bisector of the point collection angle in the slant plane of the artifacts. The azimuth direction is perpendicular to the range direction in the slant plane of the artifact. As is seen, for artifact (610) at $t_1$ and artifact (612) at $t_2$, the azimuth direction for the category-1 artifacts vary monotonically and are uniquely determined by geometry and by the delta time since the start of the collection. The azimuth IPR 614 and 616 and azimuth aliasing are determined by the collection angle and by the PRF associated with the point. As is seen in FIG. 6, the azimuth IPR 614 and 616 is very large. In both cases, the IPR exceeds the dimensions of the figure. This is due to the fact that the collection angle associated with three received pulses, all of which are generated by the same transmitted pulse, is quite small. Aliasing is the nominal aliasing for the image since the PRF associated with consecutive pulses is the imaging PRF.

As with the single receiver phase center case, the above description for category 1 artifacts is extended to 3 dimensions by configuring at least 3 receive phase centers so that the received pulses associated with a single transmitted pulse are non-coplanar.

Extracting Moving Target Information

In one configuration of the invention described herein, category 1 and category 2 artifacts are made directly visible in the final image by vastly increasing the transmitted power of the collector, and by extending the dynamic range and contrast capability of the processor. Although possible, this is generally not practical. However, the concept provides a point of departure for considering the extraction of moving target information from SAR imagery. In the configurations of the invention described herein, the above descriptions of 2-dimensional and 3-dimensional mover signatures are used to detect and characterize movers in SAR imagery.

In another configuration of the invention described herein, the imaging system is configured to filter SAR images such that category 1 artifacts (and category 2 artifacts, for certain purposes) may be made viewable and as such a moving scatterer within the scene identified. As a general overview, any filtering scheme employed herein takes advantage of known characteristics of category 1 artifacts which include: that the functional form of IPR associated with a single category one point is known, the functional form of the IPR of several closely spaced category 1 pulses is easy to determine, the distinctive shape of the long, narrow IPR associated with the single category 1 pulse makes it easier to detect either singly or in closely spaced groups, and that it is possible to "pre-filter" the image using some type of spatial filter to remove much that does not potentially have the shape.

Still further, the orientation of the category 1 IPR's in the image is uniquely determined by the time since collection start. By computing the range direction of the category 1 artifacts associated with a given time since collection start, and then filtering to retain only the IPR's whose long axes lie perpendicular to this direction, only the category 1 pulses associated with the given time frame are recovered. Finally, due to the very low cross-range resolution, a moving structure cannot typically be imaged directly. Instead, small visible spheres (3-dimensions) or dots (2-dimensions) may be placed in the image at the centers of the category 1 IPR's.

Known filtering methodologies may be employable to identify the category 1 artifact's in a SAR image. In U.S. Pat. No. 5,959,566, which is hereby incorporated by reference, the detection of movers may be performed through the identification of azimuth streaks in a SAR image. According to the present system, if a scatterer is moving slowly, many pulses may be transmitted during the time required to move through one resolution cell, and as such the mover could appear as a visible or low-intensity smear in the displayed image. The smear will consist of the sum of the category 1 images of the movers, and would be centered on the actual position locus of the mover. In such a situation, the filtering methodology described in the 566 patent could be employed to obtain the position locus under the circumstances and possibly to even generate a low resolution image of the moving object. Further processes could then be performed in order to identify the mover.

In situations where the speed of the mover increases, the category 1 images become more sparsley distributed and the smear fades. At high speeds the category 1 images no longer overlap. Various other types of filtering may provide for viewing one or more category 1 artifacts whose visibility becomes more difficult as the category 1 points become sparser.

In order to view the low intensity artifacts in the SAR image a number of signal processing steps may be performed. One process which may be employed is based on a multiple transform operation described in allowed U.S. Pat. No. 6,377,206 "Method for Clutter Rejection in Digital Imagery," by Joe V. Petty, which is hereby incorporated herein by reference in its entirety. By comparison, the filtering described in that reference only utilizes single phase centers, whereas the detection of moving objects according to the present invention uses multiple phase centers.

By applying selected transforms, each of which is designed to reveal obscured objects of interest in a single digital input image, the clutter is decorrelated across the several transformed images. However, the desired attributes of the original image are not decorrelated. Such transformed images may be combined to produce a filtered image, whereby objects of interest are more readily detectable/recognizable than with any one of the transforms alone. While the attenuation of clutter is provided by the signal processing in order to extract the signals of interest for moving objects, the decorrelated clutter may also be utilized in determining signatures. By filtering transformed digital image data, the spatial frequency of the clutter/stochastic effects may be altered and/or modified. "Noise only" data can be used for improved thresholding and for determining a matched filter template for autocorrelation. Individual pre-screening may be used for each of the three images that contain the signature of the mover.

Transforming of the image may include using a plurality of types of transforms, thereby obtaining a plurality of corresponding transformed image data. The attributes may include information about corruption of an image density distribution. Transformed image data may be filtered in order to isolate attributes of the image. The isolated attributes of the image may include a signature for a mover that meets at least one threshold intensity level.

Signal processing may include pre-screening the SAR image with a low-order discrete Karhunen-Louve transform, a Wavelet transform, and/or a Fourier transform, thereby achieving the above-noted multiple transform effect. The reading of a signature may include such transformation of the image, followed by spatial filtering. An exemplary multiple transform operation is now described with reference to FIG. 7.

Figure 7:
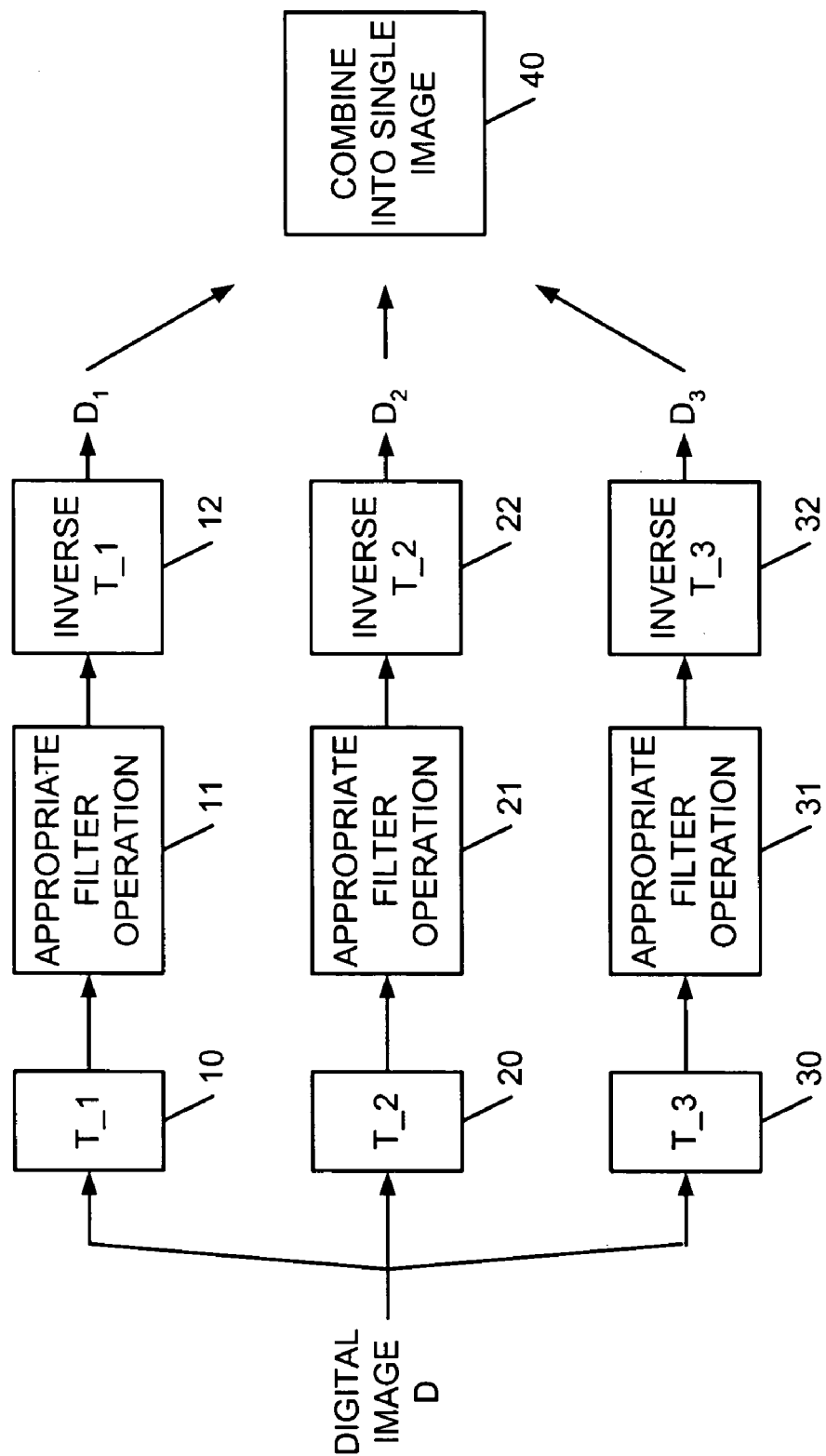
FIG. 7 discloses an exemplary multiple transfer decorrelator method.

FIG. 7 discloses an exemplary multiple transform decorrelator method that can be used to effect a multiple transform decorrelation, where the individual transforms act on clutter in distinctly different ways, causing the clutter to be decorrelated across the several transformed images, which are then combined to attenuate the clutter while preserving the structure of the desired attributes of the digital image. In FIG. 7, three transforms (10, 20, and 30) are applied to the input digital intensity image d. Filters 11, 21, 31 are applied, respectively, to the three transformed images, and the three filtered outputs are fed respectively to inverse transformers 12, 22, 32. The resulting transformed digital images $d_1$, $d_2$, $d_3$ are combined to decorrelate selected stochastic effects while preserving the structure of the signals of interest. The resulting transformed digital images $d_1$, $d_2$, $d_3$ are combined in combiner 40, producing a single digital image as the output. Particular combining methods used by the combiner 40 can include addition and/or multiplication.

In order to convert the collected data into an image, the processor assumes that all scatterers are stationary. However, a given scatterer in the output digital image, as discussed above, has a particular $\Delta R$-versus-time profile that is determined by the geometry. For a given pulse, a physical tag associates measured $\Delta R$ with the appropriate $\Delta R$-versus-time profile. Another scatterer of the output image will have a different $\Delta R$-versus-time profile, etc. In this manner, the signature of a scatterer may be developed by considering the relation between the $\Delta R$-versus-time profiles for corresponding points on the image.

Subsequent nominal image processing can include Poisson screening, Newton filtering, and shape discriminating, e.g., for producing a list of non-clutter objects for further use. Subsequent processing can also include determining the nature of clutter by using at least one of the individual transformed digital images $d_1$, $d_2$, and/or $d_3$. The individual transformed images can also be used to increase the contrast of the structure(s)/nonstochastic feature(s) relative to the clutter/stochastic effects in the particular transform domain.

As shown in FIG. 7, a signal processing of the synthetic aperture image may include inverse transforming the isolated attributes from the filtering and combining the inverse transformed attributes to obtain a filtered image. When attributes are determined by using information about corruption of an image density distribution, the matched-filter threshold(s) may be based on the noise characteristics. A combining of the attributes typically includes adding and/or multiplying attribute information. The combined attributes determined from a process such as that shown by example in FIG. 7 allows for reading of the signature by determining a relation between respective $\Delta R$-versus-time profiles for different points on the image. The relation may be expressed by utilizing the attributes, determining a density distribution for a portion of the image, and determining location information for the portion of the image as a function of the image collection time. The reading of the signature may also include determining pattern characteristics of the density distribution. Determination of pattern characteristics may involve comparing a particular density distribution with a pattern in memory. Thereby, profile information for portions of the image may be based on such pattern characteristics. Determining the presence of a moving object in the image may be performed by determining a corruption type from corruption attributes and then associating the corruption type with a particular density pattern.

Another filtering methodology which may be employed for identifying a mover in an image consists of using the simulated image of a mover as the template for a matched filter, superimposing this simulated image on an actual image, and then applying the matched filter to the composite to characterize the ability to identify the position of the mover.

According to this methodology, a number of matched filters may be mathematically generated to provide representations of any number of different scatterers. For example, individual matched filters may be generated for such moving objects as cars, tanks, boats, trucks, etc. Further, the matched filters may be refined to the point that they are specific to a particular subtype of vehicle, and filter for particular velocities and orientations of the identified vehicle relative to the collector. The filters may be stored in memory, and when a SAR image is analyzed, the processor may be configured to cycle through all of the stored filters, apply each filter to the image, and then identify which match a particular filter. Based on an any detected matches, a mover may be identified as well as its velocity and directional heading.

Processes for creating the matched filters include, but are not limited to, theoretical description of movers signatures, signatures obtained using SAR simulations, signatures obtained from actual SAR collections, and signatures obtained using tools that modify existing signatures to accommodate mover kinematics. All such processes conform to the general description of movers signature presented above.

A possible concern when using this type of matched filtering involves the nature of the background noise. Filtering used in the present invention may further include various uses of transforms. Other filtering methods that may be used include a changing of the nature of the noise to enhance the performance of the filter, and nonlinear filtering methods such as stochastic resonance and homomorphic filtering.

Other analysis processes for SAR images to identify movers may include the use of neural networks. Through the use of neural networks, analysis of the image may provide information such as the identity position, and velocity of a mover.

When using a neural network the elements of the neural network's input layer consist of the pixels of the image. The elements of the input layer are connected to the elements of various hidden layers (via weighted connections) which in turn are connected to the elements of the output layer (via weighted connection). Information about movers in the image is captured at the output layer. Such information is configured based on the manner in which the network is trained. The network is trained by adjusting the connection weights, using the description of movers signatures presented above in conjunction with one of a number of training algorithms know to the art.

Figure 8:
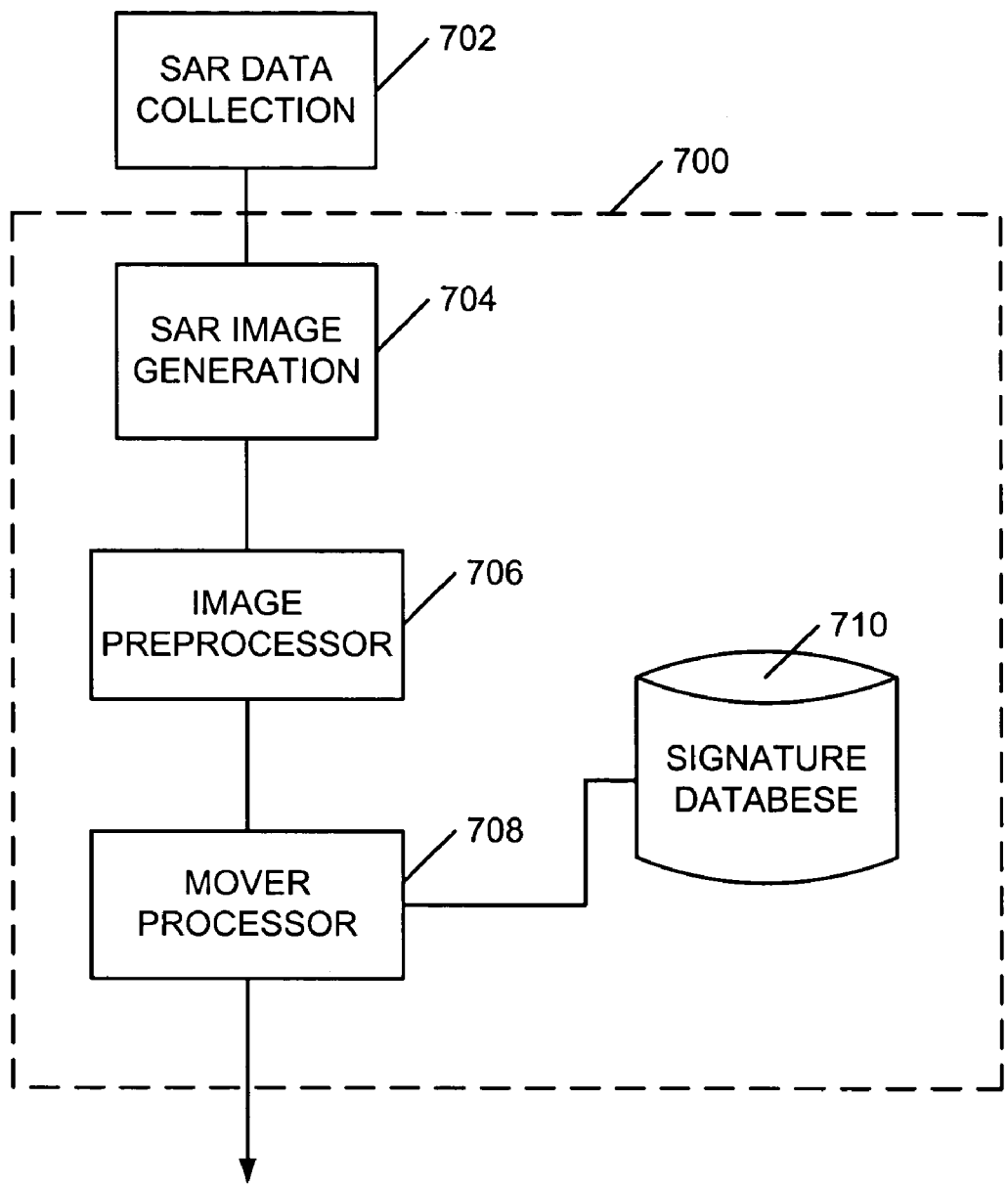
FIG. 8 discloses an exemplary system diagram wherein the system is configured to process SAR image data to identify mover and mover attributes in a SAR image.

One or more of the analysis processes described above are employable in a system configured for processing SAR imagery and identifying movers. Disclosed in FIG. 8 is an exemplary system configured for this purpose. As was discussed above, SAR image data is collected by a moving vehicle which periodically transmits the pulses at a scene of interest and detects the reflected energy. This image data is then stored for further processing. The collector and the memory employed in order to store image data are part of the SAR data collection system 702.

Once the image data is collected, it may then be provided to the SAR image creation and processing system 700. Included in this system is the SAR image generation apparatus 704, which employs the processes described above in order to convert the image data collected by the collector into a SAR image. With the SAR image created, various processes may then be performed in order to determine if there are movers within the image, and if so, further identify and analyze those movers.

Included as part of the system 700 is image preprocessor 706. Depending on the operations to be performed, at certain times a system user may wish to employ image preprocessing in order to simplify the process of mover identification. As part of this preprocessing, various filtering and clutter rejection schemes may be employed to remove unwanted artifacts from the image, to make an initial determination that one or more movers are included in the image or to filter the image to only include density distributions such as those which would include category 1 and category 2 artifacts. As a result of these processes a series of images for all the time framing may be generated. In another configuration of the invention, the preprocessing apparatus may not be included in the system and the analysis may be performed on the unfiltered SAR image using processes described above, such as with matched filters and/or neural networks which are employable for analyzing un-filtered images.

Once the image preprocessing is complete, the SAR image may then be moved to the mover processor apparatus 708 which is configured to detect and identify movers. Additional processing may include determining characteristics of the movers such as velocity and direction. In the configuration of the system shown in FIG. 8, the mover processor 708 employs matched filters in order to detect and identify movers in the images for each time frame. In connection with mover processor 708 is the signature database 710 which includes all the matched filters which have been calculated in order to analyze the image. As was discussed above, series of matched filters may be created to filter for certain types of vehicles at certain orientations. Once the matched filters are employed to analyze the image, the mover identification velocity, and direction information may be output in a desired format.

Figure 9:
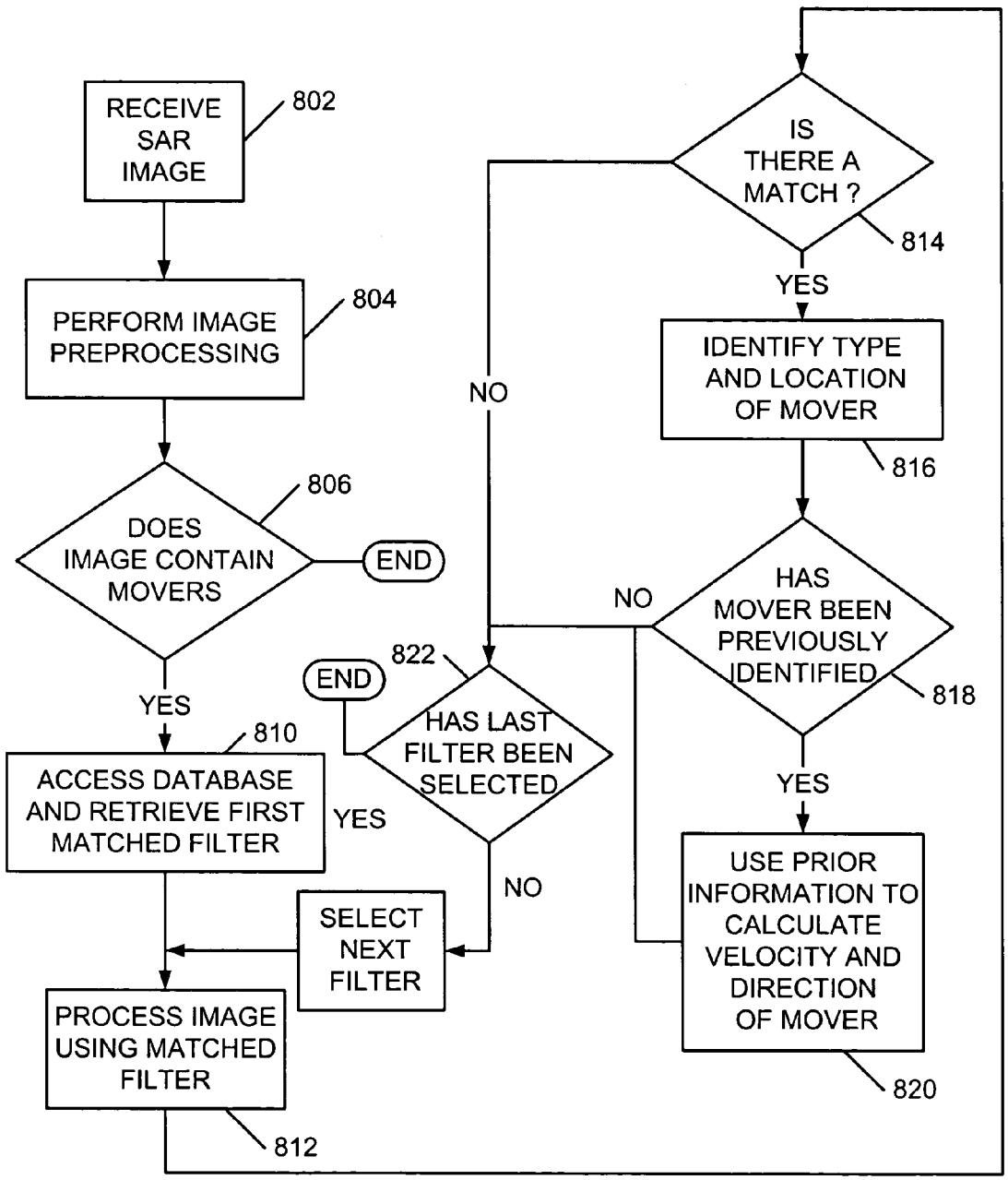
FIG. 9 discloses a flow diagram which described in detail functions performed in processing SAR image data and identifying movers in a SAR image.

In order to better understand the operations of the SAR processing system 700, provided in FIG. 9 is a flow chart which describes in detail the processes performed in mover identification when using a matched filter system. This flow chart assumes that a system user has decided to further analyze a SAR image for the detection of movers. As an initial step 804, one or more preprocessing functions may be performed on the SAR image. As described above, each pre-processing step may include various types of filtering, clutter detection, and streak detection. This preprocessing step may also be performed as an initial mover check to determine if additional processing needs to be performed on the particular image. If at step 806 determination is made that additional processing will be performed on the image, at step 810 the first step in the analysis will begin by accessing a database which includes the previously stored mathematically generated matched filters.

At this point, the matched filters will be retrieved and employed to analyze each of the images to filter for certain types of movers. If during the analysis processes at step 814 a match is identified, the information associated with the matched filter will provide an indication of the type of mover. Things which may be determined by finding a match include the type of mover and its orientation relative to the collector. A determination that may then be made at step 818 as to whether a particular mover has been identified in a previous time frame. If the mover had been previously identified, at step 820 its previous position may be overlaid with the position identified in the current time frame to calculate a direction of movement between time frames.

As the system cycles through the various matched filters, it will perform an analysis of each. After the completion of a particular process, the next filter will be accessed in memory and used in analyzing the SAR image. Once all of the matched filters have been accessed and used to analyze the SAR image, the process is complete. At this point the SAR image may be further processed to include either a marking to indicate a mover, or if enough energy has been collected, an actual rendering of the mover.

The embodiments described above are for exemplary purposes only and are not intended to limit the scope of the present invention. Various adaptations, modifications and extensions of the embodiment will be apparent to those skilled in the art and are intended to be within the scope of the invention as defined by the claims which follow.

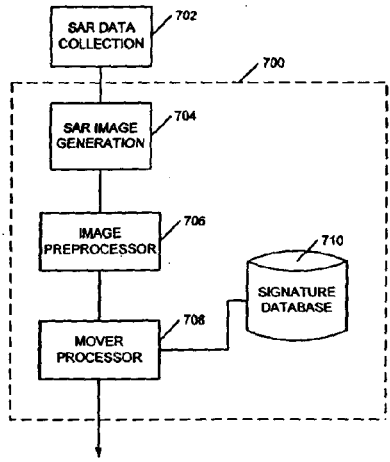

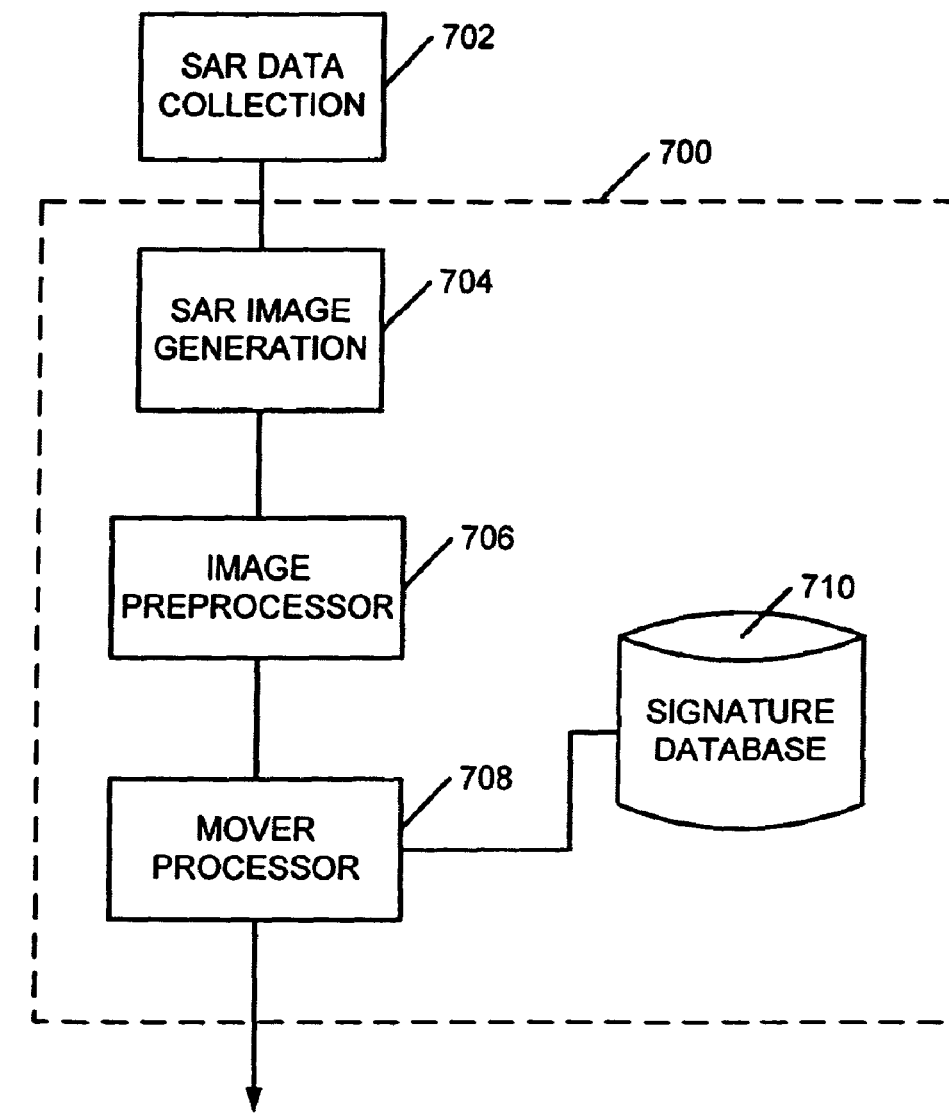

What is claimed is:

1. A method of identifying a moving object in a synthetic aperture radar (SAR) image of a region of interest, comprising:
   establishing a plurality of receive phase centers for a SAR image collector;
   obtaining a SAR image using the plurality of receive phase centers; and
   detecting in the SAR image a signature indicative of a moving object in the region of interest, wherein the signature indicative of a moving object in the SAR image is detected as a function of image collection time.

2. A method according to claim 1, wherein the signature comprises a plurality of low intensity points generated through use of the plurality of receive phase centers in the SAR image collector.

3. A method according to claim 2, wherein the plurality of low intensity image points comprise two categories which include category-1 artifacts and category-2 artifacts, wherein the category-1 artifacts being actual images of movers and the category-2 artifacts being extraneous points.

4. A method according to claim 3, wherein the category-1 artifacts are formed as a combination of a plurality of received pulses all originating from a common transmitted pulse, and the category 2 pulses being formed as a combination of a plurality or received pulses each originating from a different transmitting pulse.

5. A method according to claim 2, wherein each of the low intensity points includes at least one of:
   a unique impulse response (IPR) shape, a unique IPR orientation, and azimuthal aliasing.

6. A method according to claim 5, wherein the reading step comprises:
   determining the unique orientation of a category-1 IPR in the SAR image based on a time-since-collection-start.

7. A method according to claim 5, wherein the determining step comprises:
   computing a range direction of the category-1 artifacts associated with a given time-since-collection-start, and then filtering to retain only those IPRs with the associated range direction, thereby recovering only the category-1 artifacts associated with the given time-since-collection-start.

8. A method according to claim 5, wherein the reading step includes placing small visible dots in the SAR image at the centers of the category-1 IPRs.

9. A method according to claim 1, wherein said step of detecting comprises transforming the SAR image to a alternative domain which enhances the detection of the signature in the SAR image.

10. A method according to claim 9, wherein the filtering step further comprises pre-filtering the SAR image using a spatial filter to obtain a pre-filtered image containing only low-intensity images.

11. A method according to claim 10, wherein the pre-filtering comprising:
   identifying a shape model for a low-intensity image, the shape model being based on an impulse response (IPR) form for a low-intensity received pulse;
   determining the range direction of a plurality of low-intensity pulses associated with a predetermined time-since-collection start; and
   filtering the plurality of low-intensity pulses to retain low-intensity pulses having the associated range direction.

12. A method according to claim 1, wherein the detecting step comprises:
   generating at least one simulated image of a mover as a template for a matched filter;
   generating at least one matched filter; and
   applying the matched filter to the SAR image in order to identify a position of the moving object.

13. A method according claim 12, further comprising the step of generating a plurality of the matched filters, wherein the characteristics of the matched filter provide for identification of at least one of: type of the mover, orientation of the mover relative to the collector, and the velocity of the mover.

14. A method according to claim 13, wherein the detecting step includes:
   identifying the mover at several known instants in time in order to identify a direction and velocity of the mover.

15. A method according to claim 1, wherein the detecting step includes:
   determining linear filtering parameters for separating a signal from noise in the detected synthetic aperture image.

16. A method according to claim 15, wherein when the separating of the signal is unsuccessful, the detecting step further comprises implementing one of pre-whitening filtering and non-linear filtering of the SAR image for separating the signal from the noise.

17. A method according to claim 1, wherein the detecting step comprises determining, for each of a plurality of low-intensity points generated by a moving scatterer, an IPR shape, an IPR orientation, and an azimuthal aliasing.

18. A method according to claim 1, further comprising:
   transforming the SAR image using a plurality of types of transforms, thereby obtaining a plurality of corresponding transformed image data; and
   filtering the transformed image data in order to isolate attributes of the SAR image.

19. A method according to claim 18, wherein the attributes comprise corruption of an image density distribution.

20. A method according to claim 18, wherein the attributes comprise an image density distribution for image points that meet at least one threshold intensity level based on a noise level of the SAR image.

21. A method according to claim 18, further comprising inverse transforming the isolated attributes from the filtering.

22. A method according to claim 21, further comprising determining the presence of a moving object in the image by determining a corruption type from corruption attributes and associating the corruption type with a particular density pattern.

23. A method according to claim 22, further comprising combining at least one of: addition and multiplication, inverse transformed attributes to obtain a filtered image.

24. A method according to claim 23, wherein the detecting step comprises determining a density distribution for a portion of the SAR image.

25. A method according to claim 24, wherein the detecting step further comprises determining pattern characteristics of the density distribution.

26. A method according to claim 25, wherein the determining pattern characteristics step comprises comparing the density distribution with a pattern in memory.

27. A method according to claim 24, wherein the density distribution may be further analyzed to identify a type of mover.

28. A method according to claim 27, wherein the analysis may be performed using neural network.

29. A method according to claim 28, wherein the network is trained using characteristic density distributions to identify at least one of:
   type, positions, and velocity of a mover.

30. A system for tracking a moving object in a synthetic aperture radar (SAR) image, comprising:
   apparatus for generating a SAR image using data collected through use of a plurality of receive phase centers;
   filtering apparatus for performing a least one filtering function to enhance detection of at least one image artifact in the SAR image generated as a result of use of the plurality of receive phase centers; and
   image analyzing apparatus to analyze the at least one image artifact in the SAR image to identify at least one signature of at least one mover object.

31. The system of claim 30, wherein the filter apparatus is configured to pre-filter the SAR image using a spatial filter to obtain a pre-filtered image containing only low-intensity images.

32. The system of claim 30, wherein the filter apparatus is further configured to:
   identify a shape model for a low-intensity image, the shape model being based on an impulse response (IPR) form for a low-intensity received pulse;
   determine a range direction of a plurality of low-intensity pulses associated with a predetermined time-since-collection start; and
   filter the plurality of low-intensity pulses to retain low-intensity pulses having the associated range direction.

33. The system of claim 30, wherein the filter apparatus is further configured to identify at least two categories of very-low-intensity points in the SAR image, the categories include: category-1 artifacts and category-2 artifacts, where the category-1 artifacts are actual images of movers and the category-2 artifacts are extraneous points.

34. The system of claim 33, wherein the moving object appears in the SAR image as a sum of its associated category-1 artifacts and category-2 artifacts, the category-1 artifacts being formed using a plurality or received pulses originating from a common transmitted pulse and the category-2 artifacts being formed using a plurality of the received pulses each from a different transmitted pulse.

35. The system of claim 34, wherein the analyzing means are further configured to compute a range direction of the category-1 artifacts associated with a given time-since-collection-start, and then filtering to retain only those IPRs with the associated range direction, thereby recovering only the category-1 artifacts associated with the given time.

36. The system of claim 34, wherein the analyzing apparatus is further configured to determine, for each of a plurality of low-intensity points generated by a moving scatterer, an IPR shape, an IPR orientation, and an azimuthal aliasing.

37. The system of claim 30, wherein the filtering apparatus is further configured to transform the SAR image using a plurality of types of transforms, thereby obtaining a plurality of corresponding transformed image data and to further filter the transformed image data in order to isolate attributes of the SAR image.

38. The system of claim 37, wherein the attributes comprise an image density distribution for image points that meet at least one threshold intensity level based on a noise level of the SAR image.

39. The system of claim 38, wherein the analyzer is configured to determine the density distribution for a portion of the SAR image.

40. The system of claim 39, wherein the analyzing apparatus is further configured to determine pattern characteristics of the density distribution.

41. The system of claim 40, wherein the analyzing apparatus is further configured to access the memory device and compare the analyzed density distribution with at least one stored pattern in memory.

42. The system of claim 41 wherein the at least one stored pattern comprises a matched filter configured with characteristics of a particular type of moving object.

43. The system of claim 42 wherein the analyzing apparatus is further configured to access an plurality of the matched filters and sequentially apply the matched filters to the SAR image to identify and of the moving objects.

44. The system of claim 30, wherein data storage device accessible by the image analyzing apparatus which stores at least one known property of a signature of a moving object which may appear in the SAR image.

45. The system of claim 44, wherein the memory device stores corruption attributes employable for associating the detected corruption type with a particular density pattern.

46. The system of claim 30 wherein the analyzing apparatus is configured to employ a neural network in analyzing the SAR image to identify the moving objects.

47. The system of claims 46 wherein the network is trained using characteristic density distributions to identify at least one of:

type, position, and velocity of the moving object.

48. A method of enhancing information obtained from a synthetic aperture image, comprising:

characterizing a selected part of the synthetic aperture image to obtain a unique signature of a low-intensity scatterer, the synthetic aperture image being obtained using multiple phase centers; and enhancing information related to said low-intensity scatterer based on the unique signature.

49. A method as claimed in claim 48 wherein the enhancing of the information is a function of an image collection time for the synthetic aperture image.

* * * * *

UNITED STATES PATENT AND TRADEMARK OFFICE
CERTIFICATE OF CORRECTION

PATENT NO. : 6,943,724 B1
DATED : September 13, 2005
INVENTOR(S) : Brace et al.

It is certified that error appears in the above-identified patent and that said Letters Patent is hereby corrected as shown below:

The title page, showing the illustrative figure, should be deleted to be replaced with the attached title page.

<u>Drawings,</u>
Fig. 8, should be deleted to be replaced with drawing sheet, consisting of Fig. 8, as shown on the attached page.

Signed and Sealed this

Thirteenth Day of June, 2006

JON W. DUDAS
*Director of the United States Patent and Trademark Office*

(12) United States Patent
Brace et al.

(10) Patent No.: US 6,943,724 B1
(45) Date of Patent: Sep. 13, 2005

(54) IDENTIFICATION AND TRACKING OF MOVING OBJECTS IN DETECTED SYNTHETIC APERTURE IMAGERY

(75) Inventors: Fred C. Brace, Littleton, CO (US); Joe V. Petty, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/645,365

(22) Filed: Aug. 21, 2003

Related U.S. Application Data

(60) Provisional application No. 60/422,326, filed on Oct. 30, 2002.

(51) Int. Cl.$^7$ .............................................. G01S 13/90
(52) U.S. Cl. ................ 342/25 B; 342/25 R; 342/25 A; 342/25 F; 342/89; 342/90; 342/175; 342/195; 342/196
(58) Field of Search .......................... 342/25 R–25 F, 342/25, 27, 28, 89, 90, 118, 145, 147, 158, 342/159–164, 175, 176, 179, 190–197; 382/100, 382/103

(56) References Cited

U.S. PATENT DOCUMENTS

| | | |
|---|---|---|
| 3,614,778 A | 10/1971 | Graham et al. |
| 3,735,400 A | 5/1973 | Sletten et al. |
| 3,787,840 A | 1/1974 | Dotson |
| 3,787,849 A | 1/1974 | Sletten et al. |
| 3,975,734 A | 8/1976 | Payne |
| 4,052,889 A | 10/1977 | Mucciardi et al. |
| 4,053,885 A | 10/1977 | Tomita et al. |
| 4,086,590 A | 4/1978 | Goggins, Jr. |
| 4,164,788 A | 8/1979 | Jain |
| 4,217,583 A | 8/1980 | Hiller et al. |
| 4,241,350 A | 12/1980 | Uffelman |
| 4,559,537 A | 12/1985 | Pearson, Jr. et al. |
| 4,608,566 A | 8/1986 | Ennis et al. |
| 4,655,228 A | 4/1987 | Shimura et al. |
| 4,675,677 A | 6/1987 | Von Maydell et al. ........ 342/25 |
| 4,761,545 A | 8/1988 | Marshall et al. |
| 4,829,306 A | 5/1989 | Gjessing et al. ............ 342/159 |
| 4,858,124 A | 8/1989 | Lizzi et al. |

(Continued)

OTHER PUBLICATIONS

Rafael C. Gonzalez & Paul Wintz, "Digital Image Processing", 1997, 5 Pages (pp. 16-19).

(Continued)

*Primary Examiner*—Bernarr E. Gregory
(74) *Attorney, Agent, or Firm*—Marsh, Fischmann & Breyfogle, LLP

(57) ABSTRACT

A method of tracking a moving object in an image created by use of a synthetic aperture includes identifying a plurality of receive phase centers for an image collector, obtaining a synthetic aperture image using the plurality of receive phase centers, and reading a signature of the moving object based on the synthetic aperture image, where the reading of the signature includes identifying, in the synthetic aperture image, as a function of image collection time, a presence of the moving object. The reading of the signature may also include identifying a changing position of the moving object, and may include associating a plurality of range difference values with respective ones of the plurality of phase centers. A signature of a scatterer may be formed using only its associated ΔR-versus-time profile. The presence of a mover in the image may be determined by filtering the image to detect all or part of a signature, or by using one or more signatures to train a neural network to observe the mover directly.

49 Claims, 9 Drawing Sheets